(12) United States Patent
Whitmore (10) Patent No.: US 12,015,636 B2
(45) Date of Patent: Jun. 18, 2024

(54) AUTOMATED MODELING AND ANALYSIS OF SECURITY ATTACKS AND ATTACK SURFACES FOR AN INFORMATION SYSTEM OR COMPUTING DEVICE

(71) Applicant: James Whitmore, Carlisle, PA (US)

(72) Inventor: James Whitmore, Carlisle, PA (US)

(*) Notice: Subject to any disclaimer, the term of this patent is extended or adjusted under 35 U.S.C. 154(b) by 20 days.

(21) Appl. No.: 17/816,403

(22) Filed: Jul. 30, 2022

(65) Prior Publication Data

US 2024/0039944 A1 Feb. 1, 2024

(51) Int. Cl.
*H04L 9/40* (2022.01)
*G06N 5/02* (2023.01)

(52) U.S. Cl.
CPC .......... *H04L 63/1433* (2013.01); *G06N 5/02* (2013.01)

(58) Field of Classification Search
CPC ........ H04L 63/1433; H04L 41/16; G06N 5/02
See application file for complete search history.

(56) References Cited

U.S. PATENT DOCUMENTS

| | | | |
|---|---|---|---|
| 8,881,288 B1* | 11/2014 | Levy ..................... | G06F 21/577 709/225 |
| 11,184,374 B2* | 11/2021 | Shu ........................ | G06F 21/554 |
| 11,444,974 B1* | 9/2022 | Shakhzadyan ........ | G06F 21/577 |
| 11,575,696 B1* | 2/2023 | Ithal .................. | G06F 16/24569 |
| 2007/0226796 A1* | 9/2007 | Gilbert .................. | G06F 21/577 726/25 |
| 2018/0097833 A1* | 4/2018 | Saito .................... | H04L 63/1433 |
| 2020/0053116 A1* | 2/2020 | Soroush ............... | H04L 43/045 |
| 2023/0208882 A1* | 6/2023 | Crabtree ............... | G06F 16/951 726/22 |

FOREIGN PATENT DOCUMENTS

| | | | | |
|---|---|---|---|---|
| CN | 115296924 A | * | 11/2022 | |
| CN | 116055113 A | * | 5/2023 | |
| EP | 3664409 A1 | * | 6/2020 | .......... G06F 21/552 |
| KR | 20210074891 A | * | 6/2021 | ............. H04L 29/06 |
| WO | WO-2013181222 A2 | * | 12/2013 | ............... G06N 5/00 |

* cited by examiner

*Primary Examiner* — Sarah Su

(57) ABSTRACT

An automated method, system, device and/or computer program for performing security analysis of an information system or computing device by modeling attacks and attack surfaces using Knowledge Graphs and Graph Computing systems. A contextual data model and a set of data instances of security knowledge can be accessed. A Knowledge Graph representing a Simulated Neural Network for security attacks can be built and trained. A security analysis tool can receive a description of an attack scenario. The Graph Computing system can analyze an attack scenario using the Security Attack Knowledge Graph. A set of observations about the attack scenario and the attack surface can be generated. The observations can include attack paths, recommendations and action plans on how to detect, prevent or address the attack scenario. The action plans can be invoked and applied to the target information system and its operating environment either manually, or by automation.

15 Claims, 6 Drawing Sheets

A Flowchart for a Method for Automated Security Attack Analysis

FIG. 1 (prior art)

FIG. 2. Contextual Data Model for Security Knowledge Base and Graph

FIG. 3 Security Attack Knowledge Graph Structure

400   Security Attack Knowledge Graph Nodes and Edges

450   Security Attack Knowledge Graph Data Instances

- Node Identifier "A"                   451
- Action "initiate attack"
- Severity "Low"
- Likelihood "High"
- Domain: "Any"

- Edge Identifier "1"                   452
- Source "A" - Target "B"
- Enabler "network access"
- Severity "Low"; Likelihood "High"
- Domain: "Telecomm"

- Node Identifier "B"                   453
- Action "Map Network Topology"
- Severity "Low"
- Likelihood "Moderate"
- Domain: "Telecomm, Network"

- Edge Identifier "2"                   454
- Source "B" - Target "C"
- Enabler "Discoverable Hosts"
- Severity "High"; Likelihood "Moderate"
- Domain: "Telecomm, Network"

- Node Identifier "C"                   455
- Action "System / App Fingerprinting"
- Severity "Moderate"
- Likelihood "High"
- Domain: "Network, Application"

- Edge Identifier "3"                   456
- Source "A" - Target "D"
- Enabler "access to controlled area"
- Severity "Low"; Likelihood "High"
- Domain: "Physical"

- Node Identifier "D"                   457
- Action "Dumpster Diving"
- Severity "High"
- Likelihood "Moderate"
- Domain: "Physical"

- Edge Identifier "4"                   458
- Source "D" - Target "C"
- Enabler "discarded network configuration data"
- Severity "High"; Likelihood "Low"
- Domain: "Physical"

- Node Identifier "E"                   459
- Action "impersonate user"
- Severity "Very High"
- Likelihood "Moderate"
- Domain: "Physical, Network, Application"

- Edge Identifier "5"                   460
- Source "D" - Target "E"
- Enabler "discarded user credential data"
- Severity "Very High"; Likelihood "Low"
- Domain: "Physical, Network, Application"

FIG. 4. Security Attack Knowledge Graph Details

FIG. 5. System for Automated Security Attack Analysis

FIG. 6. A Flowchart for a Method for Automated Security Attack Analysis

AUTOMATED MODELING AND ANALYSIS OF SECURITY ATTACKS AND ATTACK SURFACES FOR AN INFORMATION SYSTEM OR COMPUTING DEVICE

BACKGROUND OF THE INVENTION

The present invention relates to a branch of systems engineering referred to as security engineering and, more particularly, to an automated solution for performing security analysis of information systems and computing devices by modeling security attacks and attack surfaces.

Security Analysis is a step in the security engineering process that helps ensure the trustworthiness and resilience of information systems and computing devices. However, this step is prone to a variety of errors and approaches.

Figure 1:
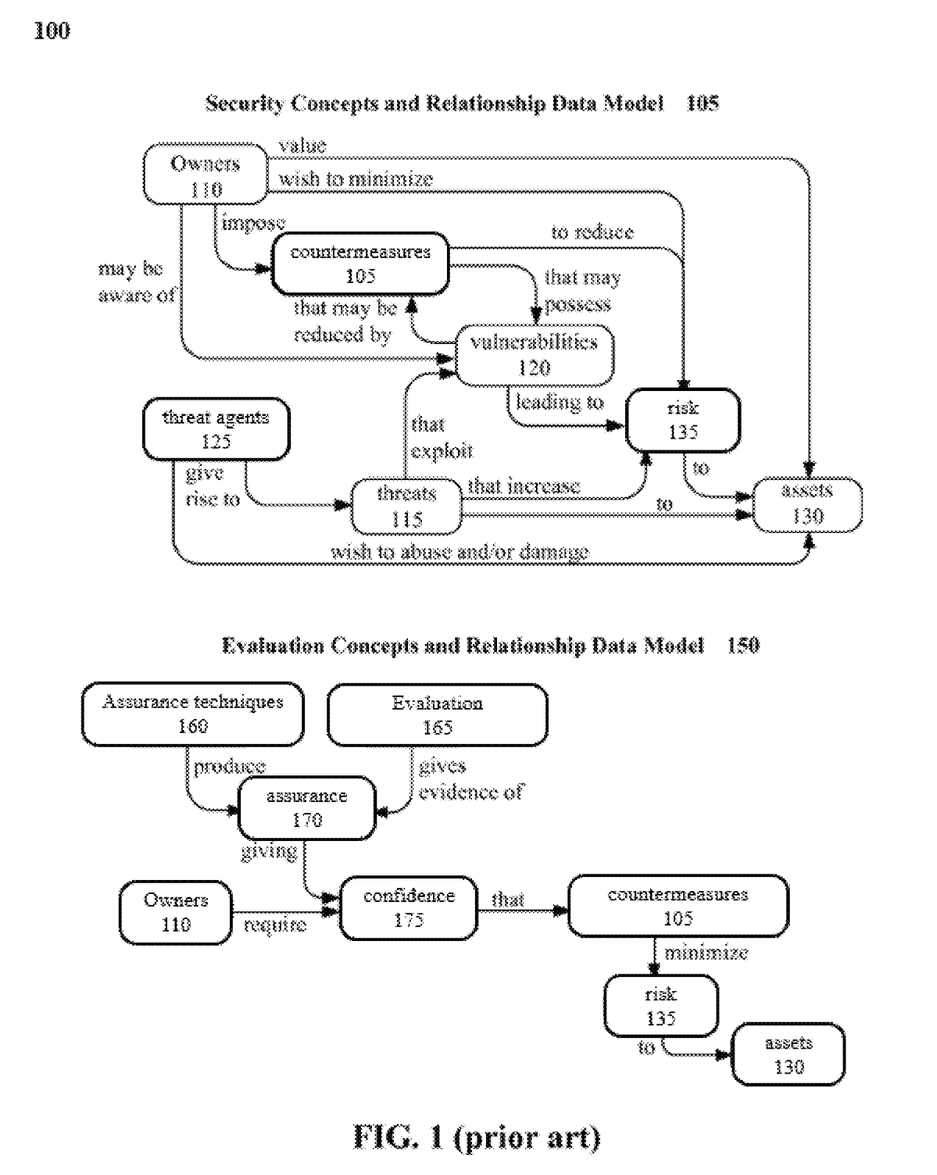
FIG. 1 (Prior Art) from ISO/IEC 15408, Common Criteria for Information System Security Evaluation, illustrates contextual models for security related information 105, and for evaluation of security for information systems 150.

Standards have been developed in an attempt to provide a common understanding and approach to security analysis and evaluation. One such standard is ISO/IEC 15408, also known as, Common Criteria for Information Technology Security Evaluation. FIG. 1 illustrates the basic data models of ISO/IEC 15408 regarding security concepts and relationships 105 and evaluation concepts and relationships 150. These data models 105 and 150 illustrate the generic terms and simple relationships conveyed by ISO/IEC 15408. Such simplistic models 105 and 150, while providing a basic foundation, have a diminished value because they are not readily applied to complex systems, such as information systems.

Data lists and databases have been compiled in an attempt to document and enumerate known vulnerabilities 105, threats 155, and behaviors and actions of threat agents 125 identified in FIG. 1. Three such data lists are the Common Weakness Enumeration, or CWE list, the Common Attack Pattern Enumeration Catalog, or CAPEC list and the Common Vulnerability Enumeration or CVE list, all published and maintained by the MITRE Corporation. A recent version of the CWE list identifies more than 900 known weaknesses that represent types of defects found in information systems and computing devices. A recent version of the CAPEC list identifies more 530 known attack patterns that represent threats to information systems and computing devices. A recent check of the CVE list shows more than 180,000 observed defects in information systems and computing devices. Such data lists and databases can provide insight into security considerations for information systems and actions of attackers; however, the data on its own has diminished value in identifying and addressing the complete and relevant set of vulnerabilities 105, threats 155 and behaviors and actions of threat agents 125 for any given information system because of the quantity and organization of the security data.

Consensus lists of vulnerabilities 105, threats 115 and behaviors and actions of threat agents 125 identified in FIG. 1 are commonly referenced as a means of dealing with the quantity and complexity of the security data. These consensus lists include: Top 25. Software weaknesses published by MITRE Corporation, Top 25. Hardware weaknesses published by MITRE Corporation, and OWASP Top 10 published by the Open Web Application Security Project. Using these lists can help provide a base level of security for an information system, in so much as the entries in the list is relevant to a given information system; however, the use of a consensus list does not show completeness of assurance techniques 160 or evaluation 165 for any specific information system.

Practice aids for security engineering have been published in an attempt to build a common understanding and approach on how to perform security analysis or evaluate information systems outlined in ISO/IEC 15408. One such practice aid is NIST SP800-207 Zero Trust Architecture, published by the US Government National Institute of Standards and Technology, where Zero Trust (ZT) is the term for an evolving set of cybersecurity paradigms that move defenses from static, network-based perimeters to focus on users, assets, and resources. The document provides tenets for design, development and operation of systems in a way that protects assets, works to identify and manage vulnerabilities and attacks; however, the document also points out that . . . "ZT as a strategy for the design and deployment of enterprise infrastructure is still a forming concept. Industry has not yet coalesced around a single set of terms or concepts to describe ZT Architecture components and operations. This (fact) makes it difficult for organizations to develop coherent requirements and policies for designing zero trust enterprise infrastructure and procuring components". Further, the document points out that . . . "as ZT Architecture matures, more deployments are seen, and experience is gained, the effectiveness of ZT Architecture in shrinking the attack surface of resources may become apparent. The metrics of success of ZT Architecture over older cybersecurity strategies will also need to be developed."

In the current environment, security engineers need the ability to define, describe and analyze a complete attack surface for an information system and its infrastructure in order to design and implement controls and countermeasures that shrink the attack surface to a point within the risk tolerance of the involved organization, stakeholders and users.

SUMMARY OF THE INVENTION

One aspect of the present invention can include an automated method for performing security analysis by modeling security attacks and attack surfaces for an information system or computing device. Such a method can begin with the receipt by a security analysis tool of a request for security analysis in the form of a security analysis manifest that includes an attack scenario. A contextual data model and a set of data instances for known attacks on information systems and computing devices can be accessed. The contextual data model can define relationships between attacks and system components, system characteristics, assets and/or attacker behaviors and actions. The contextual data model and set of data instances can be organized as a connected knowledge graph of security attack related information useable by Graph Computing systems. A connected knowledge graph of security attack can function as a Simulated Neural Network. A connected knowledge graph of security attack related information can be accessed for the purpose of modeling and analyzing security attack scenarios. The access can take the form of submitting queries to a Graph Computing system. A Graph Computing system can generate an output consisting of a set of enumerated attacks for the attack scenario. The output can include detailed information about the attacks in the attack scenario. The output of the security attack analysis can be reviewed and queries can be revised. The final output can include lists of attacks and related information, recommendations on preventing, mitigating or recovering from attacks, and action plans. The recommendations and action plans that can be implemented either by manual or automated means. The connected knowledge graph can be trained for increased accuracy and completeness of analysis over time.

Another aspect of the present invention can include an automated system for performing security analysis by modeling security attacks and attack surfaces for an information system or computing device. Such a system can include a contextual data model, a set of data instances organized as a connected knowledge graph that contains relationships between security attacks and information systems, components and physical and logical assets. The contextual data model can be a composite of one or models related to security attacks, security weaknesses, attacker techniques and behaviors and analytical insights. The information system security attack analysis tool can be configured to generate a recommendation and an information system action plan for a specified scenario. The recommendations and action plans can selectively be implemented in a static fashion or in a dynamic fashion in real time.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium. In a preferred embodiment, the invention is implemented in software, which includes but is not limited to firmware, resident software, microcode, software containers, cloud computing systems, etc.

Furthermore, the invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Any suitable computer usable or computer readable medium may be utilized. The computer-usable or computer readable medium may be, for example but not limited to, an electronic, magnetic, optical, electromagnetic, infrared, or semiconductor system, apparatus, device, or propagation medium. Examples of a computer-readable medium include a semiconductor or Solid-state memory, magnetic tape, a removable computer diskette, a random-access memory (RAM), a read-only memory (ROM), an erasable programmable read-only memory (EPROM) or Flash memory, a rigid magnetic disk, an optical disk, etc. Current examples of optical disks include compact disk-read only memory (CDROM), compact disk-read/write (CD-R/W), DVD and a portable Universal Serial Bus (USB) attached storage device. Other computer-readable medium can include a transmission media, such as those supporting the Internet, an intranet, a personal area network (PAN), or a magnetic storage device. Transmission media can include an electrical connection having one or more wires, an optical fiber, an optical storage device, and a defined segment of the electromagnet spectrum through which digitally encoded content is wirelessly conveyed using a carrier wave.

Note that the computer-usable or computer-readable medium can even include paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in an object-oriented programming language Such as Java, Javascript, C++, Python, XSLT, or the like. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

A data processing system suitable for storing and/or executing program code will include at least one physical or logical processor coupled directly or indirectly to memory elements through a system bus. The processor elements can be analog, digital or quantum in nature. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, wireless and Ethernet cards are just a few of the currently available types of network adapters.

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 5:
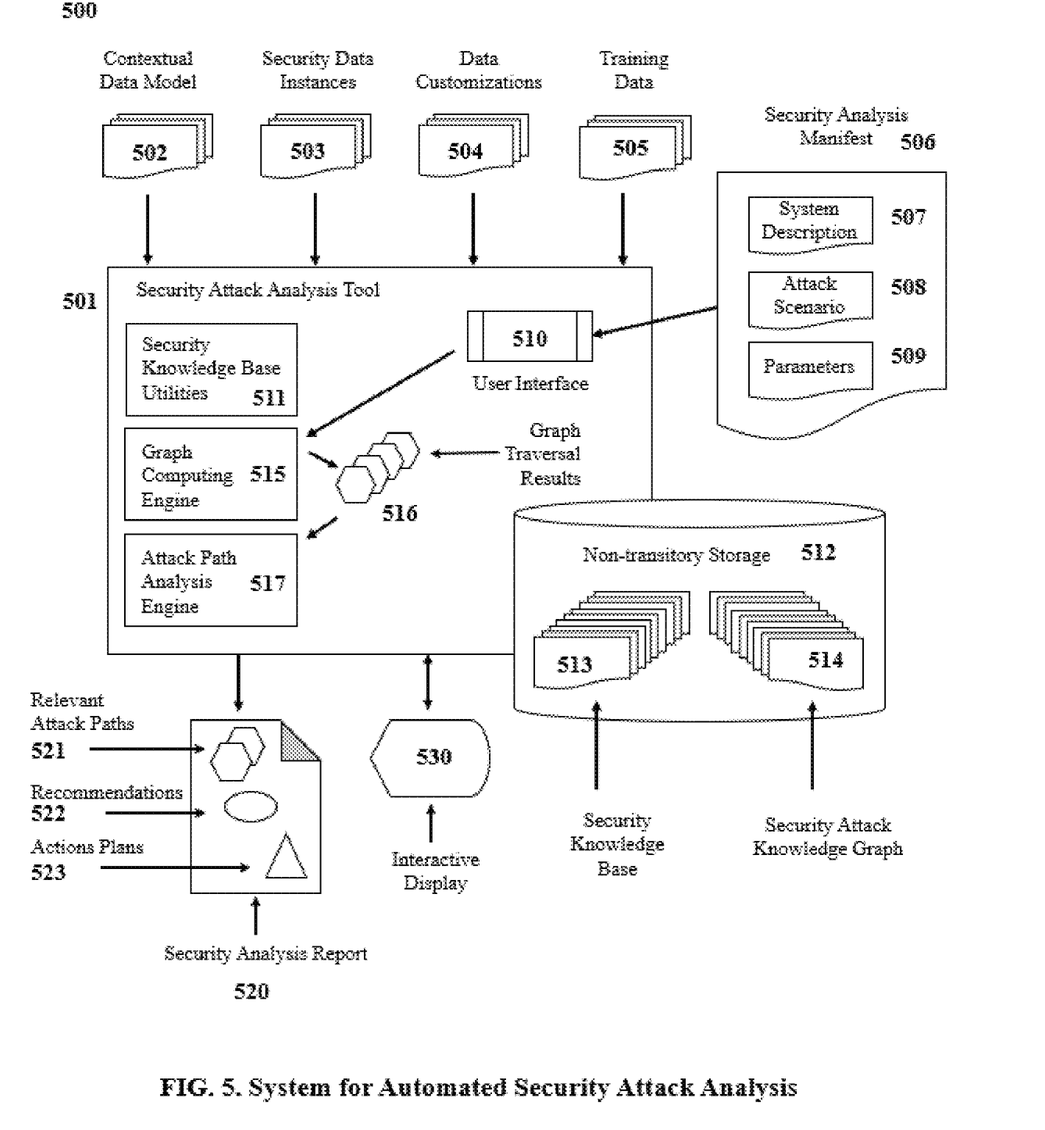
FIG. 5 is a schematic diagram of a system for performing security analysis of information systems and computing devices by modeling security attacks and attack surfaces in accordance with embodiments of the inventive arrangements disclosed herein.

FIG. 5 is a schematic diagram of a system 500 for performing security analysis of an information system by modeling attacks and attack instances in accordance with embodiments of the inventive arrangements disclosed herein.

A security attack analysis tool 501, can consist of a user interface 510, a set of Security Knowledge Base Utility programs 511, a Graph Computing Engine, 515, an Attack Analysis Engine 517, and non-transitory storage 512. The security attack analysis tool 501 can accept input in the form of a Contextual Data Model 502, Security Data Instances 503, Data Customizations 504, Training Data 505 and Security Attack Manifests 506. The security attack analysis tool 501 can interact with a human user via an Interactive Display 530. The security attack analysis tool can generate security analysis reports 520.

Figure 2:
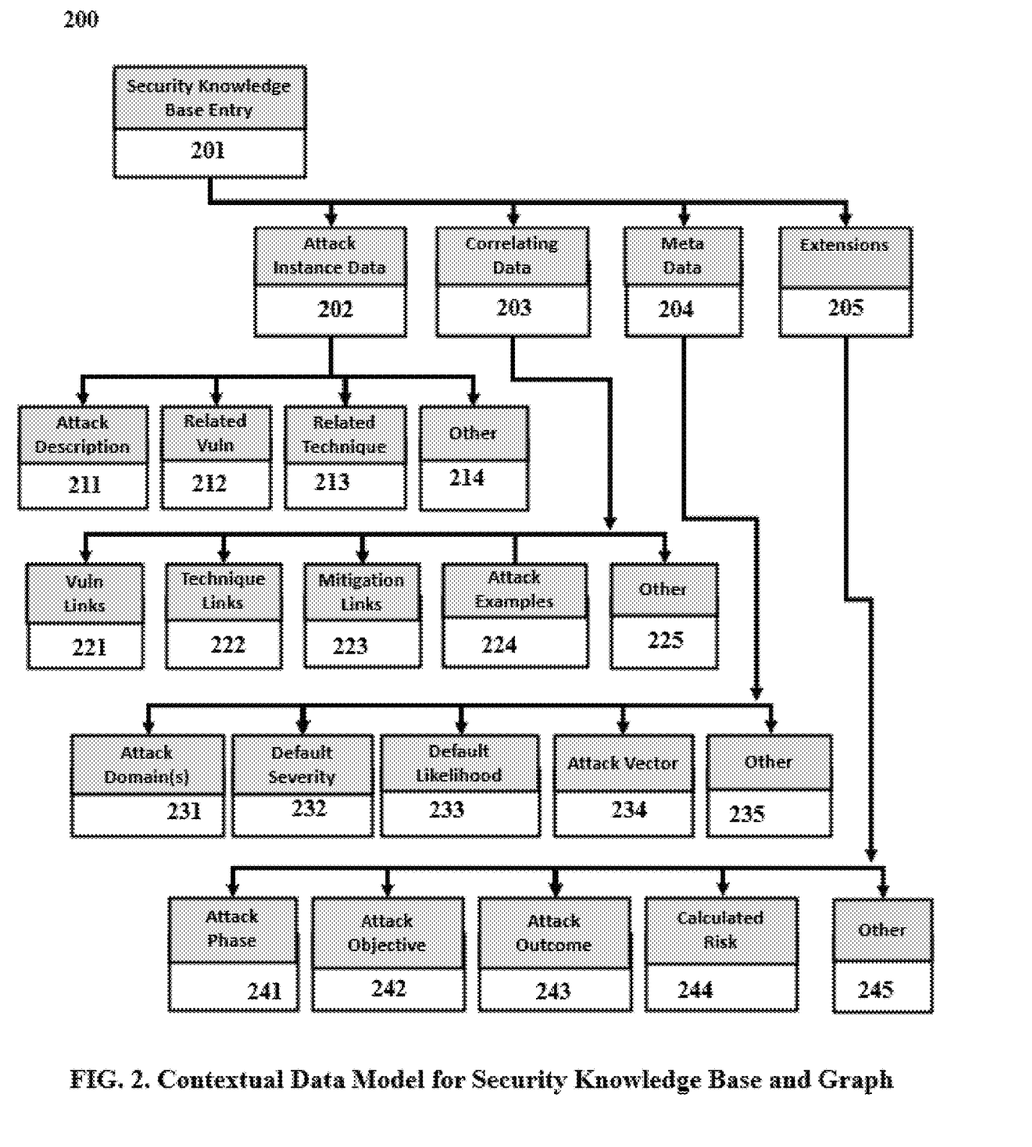
FIG. 2 illustrates a contextual data model for the elements of a security knowledge base in accordance with embodiments of the inventive arrangements disclosed herein.

FIG. 2 describes a Contextual Data Model 502 for a Security Knowledge Base. Each entry 201 in the contextual data model can include descriptive information about an instance of a known security attack 202, other correlating data 203 about the attack, meta data 204 derived from the attack, and data extensions 205 that facilitate the mapping of security attack entries.

The Security Data Instances 503 can be assembled from historical data or experiential knowledge. A preferred embodiment of the Security Data Instances can include MITRE Common Attack Patterns (CAPEC), MITRE Common Weakness Enumeration List (CWE), MITRE Common Vulnerability Enumeration List (CVE), US Government NIST National Vulnerability Database (NVD), and other authoritative sources.

Data Customizations 504, can represent modifications to default values from raw CAPEC, CWE, CVE, NVD, and other data sources to better align values and metrics of attacks to a given target system, organization or enterprise. For example, one enterprise may consider an attack that compromises one target system as a "moderate" impact, where the same attack on a different target system may be a "catastrophic" impact.

Training Data 505 may contain the details of confirmed security attack scenarios in the form of Security Attack Manifests 506, to be used to test the Security Attack Analysis Tool in order to verify correct operation.

The security analysis manifest 506 can contain: a description of a target information system 507, an attack scenario 508, a set of parameters 509 that provide criteria for the security analysis.

Figure 3:
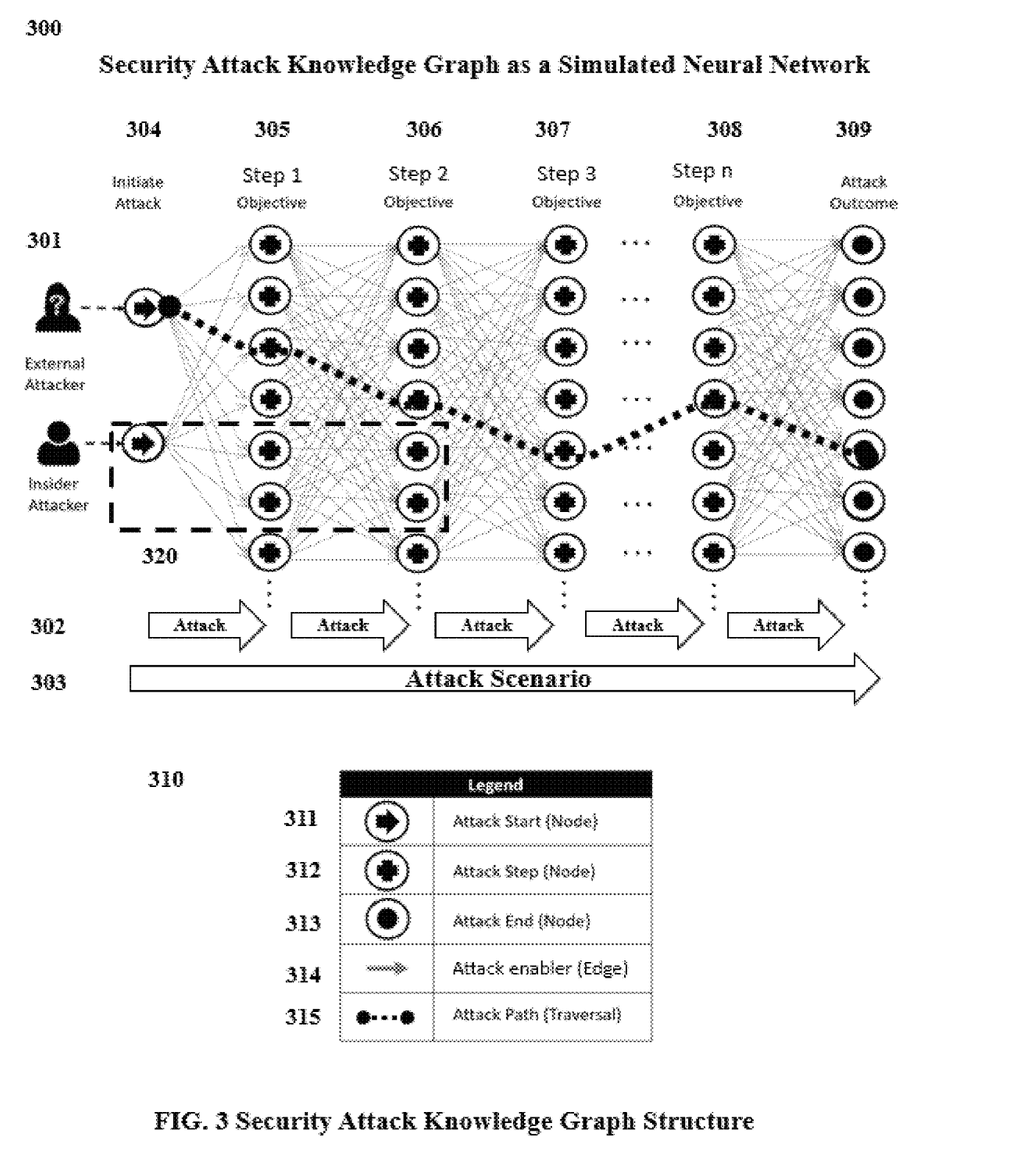
FIG. 3 illustrates the concept of the structure of a connected graph that can represent Security Attack Knowledge, where the connected graph can consist of an organized grouping of nodes and edges suitable for use with Graph Computing systems. The connected graph can represent a Simulated Neural Network in accordance with embodiments of the inventive arrangements disclosed herein.

FIG. 3, illustrates the concept and structure of a security attack knowledge graph. Connected graph 301 can consist of an organized grouping of nodes and edges suitable for modeling security attacks 302 and security attack scenarios 303. The connected graph represented in FIG. 3 is consistent with the concept of a Simulated Neural Network. The legend 310 shows three types of nodes: attack start nodes 311, attack step nodes 312 and attack end nodes 313 and one type of edge 314 that represents an attack enabling feature or weakness in a target information system. A traversal of the connected graph 301 represented by the dotted line 315 illustrates an attack path from a starting node 304 through a number of attack step nodes 304, 306, 307 and 308 to an end node 309.

Figure 4:
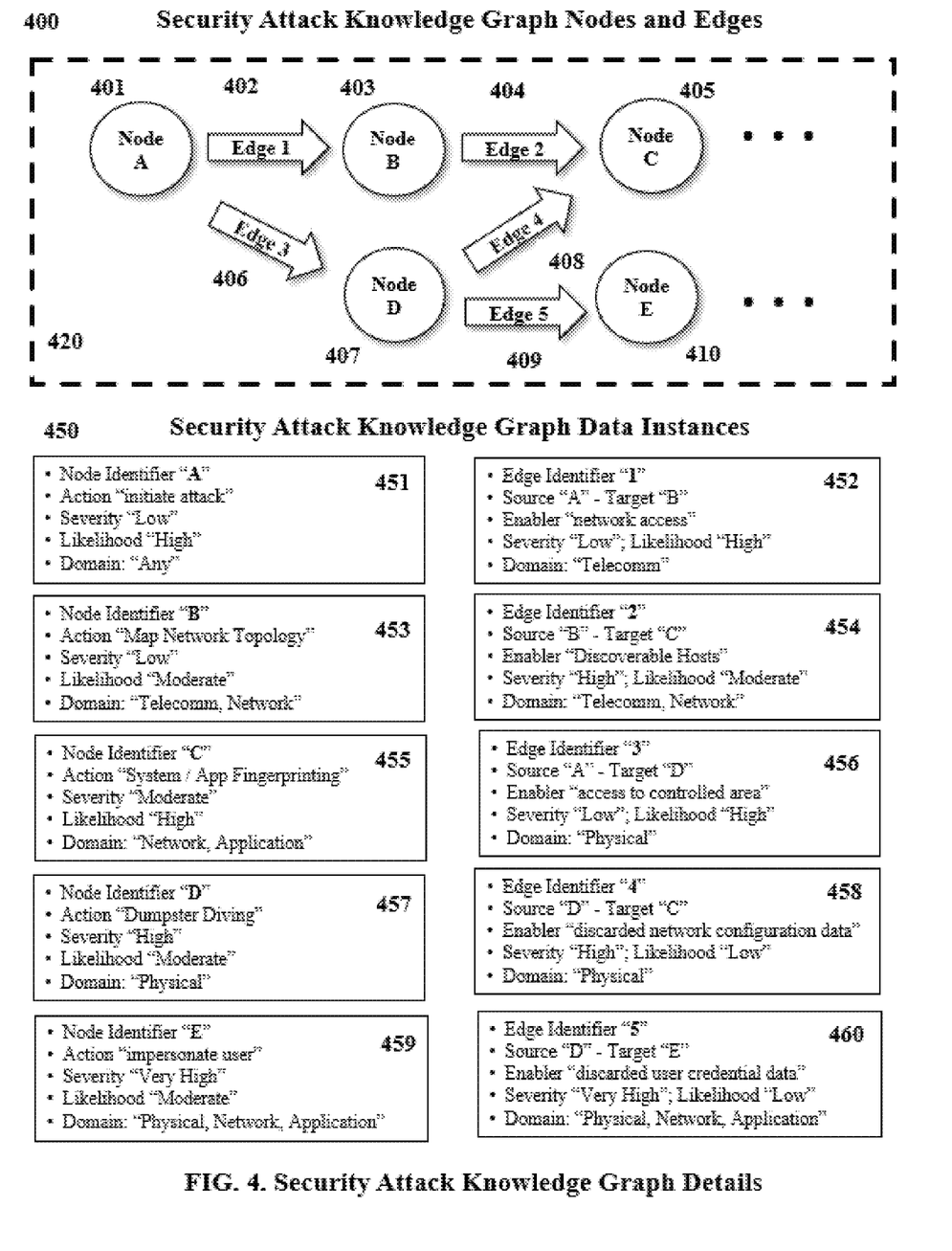
FIG. 4 illustrates an example of how information from a security knowledge base referenced in FIG. 2 can be encoded as nodes and edges to form a connected Knowledge Graph of Security Attacks referenced in FIG. 3. The structure and format of the Knowledge Graph of Security Attacks is suitable for use with Graph Computing systems in accordance with embodiments of the inventive arrangements disclosed herein.

FIG. 4 further explains the inset of connected graph 301 identified as block 320. Image 420 in FIG. 4 illustrates an organized set of graph nodes and graph edges, where Node A 401 is connected to Node B 403 by Edge 1 402, and so on. The Graph Data Instances 450 further illustrate the relationship between the nodes and edges in the Security Attack Knowledge Graph 500. Each node in the graph is associated with contextual data items: 451, 453, 455, 457 and 459 that detail information about respective attack. Each edge in the graph is associated with contextual data items 452, 454, 456, 458 and 460 that detail information about respective attack enablers.

Each edge in connected graph 420 in FIG. 4 maps a Source Node to a Target Node. This can be illustrated by considering the contextual data items shown in knowledge graph data instances 450. Connected graph 420 in FIG. 4 shows three examples of attack paths. Attack Path #1: Node A to Edge 1 to Node B to Edge 2 to Node C; Attack Path #2: Node A to Edge 3 to Node D to Edge 5 to Node E; Attack Path #3: Node A to Edge 3 to Node D to Edge 4 to Node C.

To illustrate the concept of graph traversals, a Graph Computing system may evaluate the connected graph to determine active and relevant attack paths. For example, Attack Path #1 maps Node A with action "Initiate Attack" 451 to Node B with action "Map Network Topology" 453 to Node C with action "System/App Fingerprinting" 455.

Attack Path #1 can be considered "active and relevant" for a given attack scenario if the enabler of "network access" on Edge 1 452 is "true", and the enabler of "discoverable hosts" on Edge 2 454 is "true". Conversely, Attack Path #1 might not be considered active and relevant for a given attack scenario if the enabler of "network access" on Edge 1 451 is "false", or the enabler of "discoverable hosts" on Edge 2 454 is "false". Similarly, Attack Path #2 maps Node A with action "Initiate Attack" 451 to Node D with action "Dumpster Diving" 457 to Node E with action "Impersonate User" 459. This path can be considered active for a given scenario if the enablers defined in Edge 3 456 and Edge 5 460 are considered "true". Similarly, Attack Path #3 maps Node A with action "Initiate Attack" 451 to Node D with action "Dumpster Diving" 457 to Node C with action "System/App Fingerprinting" 455, as an alternative to Attack Path #1. This path can be considered active for a given scenario if the enablers defined in Edge 3 456 and Edge 4 458 are considered "true". It follows that a larger connected graph with properly configured Nodes and Edges can be evaluated by a Graph Computing system to determine any and all Nodes and Edges that represent "active and relevant" attack paths.

Returning to FIG. 5, the Security Knowledge Base Utilities 511 in support the building, update and training of the Security Knowledge Base 513 and the Security Attack Knowledge Graph. One Security Knowledge Base Utility 511 can accept input in the form of a contextual Data Model 502, Security Data Instances 503 and Data Customizations 504, and create and store an instance of a Security Knowledge Base 513 in non-transitory storage 512. The Security Knowledge Base 513 can take any of several forms to include structured data or unstructured data, to include: basic text data, rich text data, hypertext data, XML encoded data, JSON encoded data, CSV encoded data, etc., stored in either files or query-able databases.

A second Security Knowledge Base Utility 511 can accept input in the form of a Contextual Data Model as described in FIG. 3 and FIG. 4, and create an instance of a Security Attack Knowledge Graph 514 in non-transitory storage 512. The Security Attack Knowledge Graph 514 can take any of several forms to include structured data or unstructured data, to include: textual data, XML encoded Data, JSON encoded data, GraphML encoded data, or another encoding scheme.

A third Security Knowledge Base Utility 511 can accept input in the form of Training Data 505, issue queries to the Graph Computing Engine and verify the correctness of the results.

A fourth Security Knowledge Base Utility 511 can accept input in the form of new or updated Security Data Instances 503 and Data Customizations, and update the Security Knowledge Base 513 and the Security Attack Knowledge Graph 514.

The User Interface 510 in FIG. 5 accepts a Security Analysis Manifest 506, builds a set of queries suitable for use with a Graph Computing system, and submits queries to the Graph Computing Engine 515 for processing. The queries take the form required by the Graph Computing Engine.

The Graph Computing Engine 515 accesses the Security Attack Knowledge Graph 514, and processes the queries as traversals of a Security Attack Knowledge Graph 514. The Graph Computing Engine 515 creates a set of Graph Traversal Results 516, that are passed to the Attack Path Analysis Engine 517.

The Attack Path Analysis Engine 517 organizes and analyzes the Graph Traversal Results 516 using parameters from the Security Analysis Manifest 506. The output of the Attack Path Analysis Engine may be presented to the human user for review via an Interactive Display 530, wherein the human user may make changes to the Security Analysis Manifest 509 and resubmit the queries, or the Security Attack Analysis Tool 501 may generate a security analysis report 520 that can include relevant attack paths 521, recommendations 522 and action plans 523 for an information system based upon the content of a security analysis manifest 506.

Figure 6:
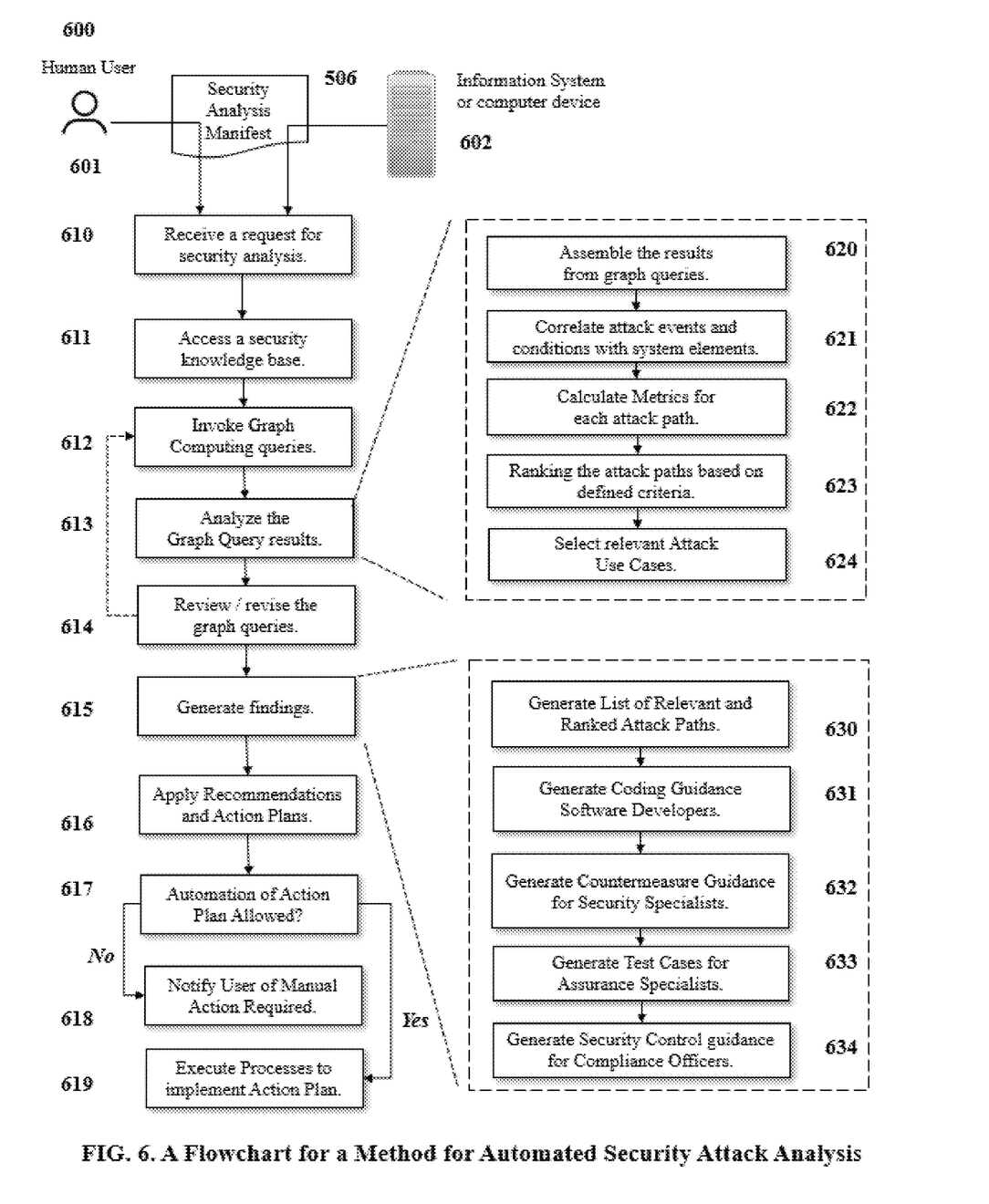
FIG. 6 is a flow chart of a method for performing security analysis of information systems and computing devices by modeling security attacks and attack surfaces in accordance with an embodiment of the inventive arrangements disclosed herein.

FIG. 6 is a flow chart of a method for performing security analysis of an information system by modeling attacks and attack instances in accordance with embodiments of the inventive arrangements disclosed herein.

Method 600 can be performed within the context of system 500 and/or using the sample security concepts and relationships data model 100 of FIG. 1, or any other system configured to perform a security attack analysis for an information system using a contextual data model.

Method 600 can begin with step 610 where a Security Analysis Manifest 506 can be received from a human user 601 or an information system or computing device 602. Data instances for the security attack analysis can be received in step 610. Step 610 can include a trigger event or condition in the form of data from an IT system and/or can receive a user-initiated request in the form of a scenario for which a security attack analysis is to be performed.

The data model and data instances in a security knowledge base can be accessed with Step 611. The security knowledge base access in step 611 can include assembly and invocation of queries in step 612. The results of the graph queries can be analyzed as represented by step 613. Analysis of Graph query results can include correlation of information from the security manifest with the graph query results in step 621. The analysis can also include calculation of metrics for the attack paths from step 622 and ranking of attack paths from step 623. Correlations, calculations and rankings lead to selection of relevant attack paths in step 624. The selected results from step 624 can be reviewed and the graph queries can be modified and resubmitted as in step 614.

The graph queries from step 614 can be used to generate a set of findings in step 615. The findings can include any or all of the following: a list of relevant and ranked attack paths in step 630, a set of coding guidance for software developers in step 631, a set of guidance for security countermeasures for security specialists in step 632, a set of test cases for security assurance specialists in step 633, a set of guidance for security controls for compliance officers, and the like.

Once the analysis of step 615 is complete, the recommendations and action plans can be applied in step 616 according to the parameters in the security manifest 506.

In step 617, it can be determined if the course of actions contained in the action plan can be automated. When automation is allowed, the necessary processes can be executed to implement the course of action in step 619. When automation is not allowed, step 618 can execute where a user is notified that the action plan must be implemented manually.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for automating security analysis of an information system or computing device by modeling attacks and attack surfaces using a Security Attack Knowledge Graph with a Graph Computing system and algorithms comprising:

receiving, via at least one computer device executing computer program instructions, a request for a security analysis originating from a human user, wherein the request includes a manifest for the security analysis comprising, a description of a target system and its operating environment, a set of parameters and criteria describing the security analysis, and at least one attack scenario; and, accessing, via the at least one computer device executing the computer program instructions, a security knowledge base, said security knowledge base comprising, a contextual data model of security attack-related information along with detailed data on known attack instances, and is organized in a form of a Security Attack Knowledge Graph compatible with the Graph Computing system and algorithms; and, invoking, via the at least one computer device executing the computer program instructions, at least one query to the Graph Computing system, said Graph Computing system processes the query as a traversal of the Security Attack Knowledge Graph to produce a result, wherein said result comprises one or more attack paths within the attack scenario for the target system, and a combined result of a set of queries represents an attack surface, comprising a plurality of attack paths for the attack scenario for the target system; and, analyzing, via the at least one computer device executing the computer program instructions, the results of graph queries to produce a set of relevant attack paths, wherein each relevant attack path correlates with information in the security analysis manifest; and, reviewing, via the at least one computer device executing the computer program instructions, the results of the analysis of the graph query results, wherein reviewing comprises, using textual, graphical and interactive techniques to visualize the results for the purpose of improving the security analysis by invoking revised queries to the Graph Computing system; and, generating, via the at least one computer device executing the computer program instructions, a finalized security analysis report, said report comprising, a list of the relevant attack paths along with corresponding recommendations and action plans from the security knowledge base for said target system, wherein recommendations and action plans comprise steps and techniques to identify, detect, diagnose, mitigate an attack, prevent an attack, or recover from the occurrence of an attack; and, applying, via the at least one computer device executing the computer program instructions, the recommendations and actions plans generated by the security analysis to the target system.

2. The method of claim 1, wherein the request for the security analysis originates from a computing device executing computer program instructions.

3. The method of claim 1, wherein the target system is represented by a design document or specification for an information system or computing device to be built.

4. The method of claim 1, wherein analyzing the results of the graph queries comprising, assembling, via the at least one computer device executing the computer program instructions, the results of the graph queries that represent a plurality of attack paths for an attack scenario for the target system into a form suitable form for use with analytical methods; and, calculating, via the at least one computer device executing the computer program instructions, values for metrics for each attack path, where calculating comprising, use of quantitative or qualitative methods to compute effective values for severity, likelihood, impact and risk; and, determining, via the at least one computer device executing the computer program instructions, the relevance of each attack path on said target system, wherein determining comprising, use of contextual analysis, statistical analysis and inferential analysis, to identify relationships between an attack event and the elements, configuration, state, operational parameters, or operating environment, of said target system; and, ranking, via the at least one computer device executing the computer program instructions, each attack path in the plurality of attacks, wherein ranking comprises, ordering the attack paths from most significant to least significant based on a prioritized view of relevance, correlations and calculations; and, selecting, via the at least one computer device executing the computer program instructions, the ranked attack paths from the initial set of attack paths, wherein the selecting comprises, retaining any attack path that meets or exceeds the relevance and ranking criteria in the security analysis manifest.

5. The method of claim 1, wherein applying the recommendations and actions plans generated by the security analysis to the target system, comprising:
receiving, via at the least one computer device executing the computer program instructions, the recommendations and action plans for at least one relevant security attack use case; and,
initiating, via at the least one computer device executing the computer program instructions, the recommendations and action plans for said relevant security attack use cases; and,
determining, via the at least one computer device executing the computer program instructions, an automation status of the action plan; and when the automation status is determined to be affirmative, automatically executing, via the at least one computer device executing the computer program instructions, at least one automation rule to implement the action plan, wherein the automation rule comprises at least one automated process, wherein the at least one automated process executes a series of commands described in the recommendations and action plan.

6. The method of claim 5, wherein the automation status is controlled by a user-configurable value for security analysis action plans.

7. The method of claim 5, further comprising: when the automation status is determined to be adverse, presenting the action plan for manual implementation.

8. The method of claim 5, wherein applying the recommendations and actions plans represents a security risk assessment for the target system.

9. The method of claim 5, wherein applying the recommendations and actions plans represents a security vulnerability assessment for the target system.

10. The method of claim 5, wherein applying the recommendations and actions plans represents a security threat model for the target system.

11. A system for automating security analysis of an information system or computing device by modeling attack and attack surfaces using a Security Attack Knowledge Graph with a Graph Computing system and algorithms comprising:
a security knowledge base that is digitally encoded in a non-transitory computer usable storage medium, said the security knowledge base is organized by a contextual data model; and,
a set of data instances digitally encoded in a non-transitory computer usable storage medium, said set of data instances representing descriptions and reference information related to security attacks on information systems and computing devices; and,
a Security Attack Knowledge Graph that is digitally encoded in a non-transitory computer usable storage medium, said Security Attack Knowledge Graph consists of information and data instances from the security knowledge base, and, is organized by a contextual data model that is used by the Graph Computing system and algorithms to perform traversals; and,
a security analysis tool, comprising computer program instructions stored on a non-transitory storage medium and that are executable by at least one processor, configured to utilize the contextual data model and the set of data instances to automatically perform the security analysis, wherein the security analysis accounts for a plurality of known attack scenarios, wherein the output of the security analysis includes an action plan, wherein the action plan is determined for a user-defined scenario, wherein said user-defined scenario defines a set of conditions for automatically initiating a programmatic operation that results in the security analysis tool generating the action plan, wherein said security analysis tool is selectively configurable to produce said action plan for informing, preventing, mitigating security attacks at a defined point in time, wherein said security analysis tool is selectively configurable to produce said action plan as a static attack analysis for a defined time window, and wherein said security analysis tool is selectively configurable to produce said action plan for a dynamic security analysis against the information system in at least one of real-time and near real time.

12. The system of claim 11, wherein the security analysis tool further comprises, a user interface, produced by computer program instructions stored on a non-transitory storage medium being executed by at least one processor, configured to accept at least one user-entered parameter, wherein the at least one user-entered parameter defines a condition for one aspect a security attack contained within the contextual data model.

13. The system of claim 11, wherein the security analysis tool further comprises: a set of automation rules defining at least one automated process, wherein the at least one automated process executes a series of commands within the information system to implement the at least one recommendation or course of action of the action plan.

14. The system of claim 11, wherein an execution of an automation rule is performed automatically based upon a business rule.

15. The system of claim 11, wherein at least one data instance of the set of data instances is received in real-time from at least one component of the information system.

* * * * *